(12) United States Patent
Schultz

(10) Patent No.: US 6,720,672 B2
(45) Date of Patent: Apr. 13, 2004

(54) MOTORCYCLE WIRING HARNESS

(76) Inventor: Ernest Robert Schultz, 560 SW. Ruby St., Madras, OR (US) 97741

( * ) Notice: Subject to any disclaimer, the term of this patent is extended or adjusted under 35 U.S.C. 154(b) by 179 days.

(21) Appl. No.: 10/123,350

(22) Filed: Apr. 15, 2002

(65) Prior Publication Data

US 2003/0193242 A1 Oct. 16, 2003

(51) Int. Cl.⁷ .................................................. F02P 3/06
(52) U.S. Cl. ...................................... 307/10.6; 123/595
(58) Field of Search ............................... 307/10.6, 328; 123/595, 594, 618, 630

(56) References Cited

U.S. PATENT DOCUMENTS

| | | | | |
|---|---|---|---|---|
| 6,289,881 B1 | * | 9/2001 | Klopp | 123/525 |
| 6,339,743 B1 | * | 1/2002 | Young et al. | 701/115 |
| 6,560,528 B1 | * | 5/2003 | Gitlin et al. | 701/115 |
| 2003/0136379 A1 | * | 7/2003 | Nagatsu et al. | 123/406.24 |

* cited by examiner

Primary Examiner—Gregory J. Toatley, Jr.

(57) ABSTRACT

A motorcycle wiring harness for use with aftermarket motorcycle frames and one of several types of Harley Davidson® engines that permit the engine to be operated without one or more of the factory provided features or interlocks.

4 Claims, 7 Drawing Sheets

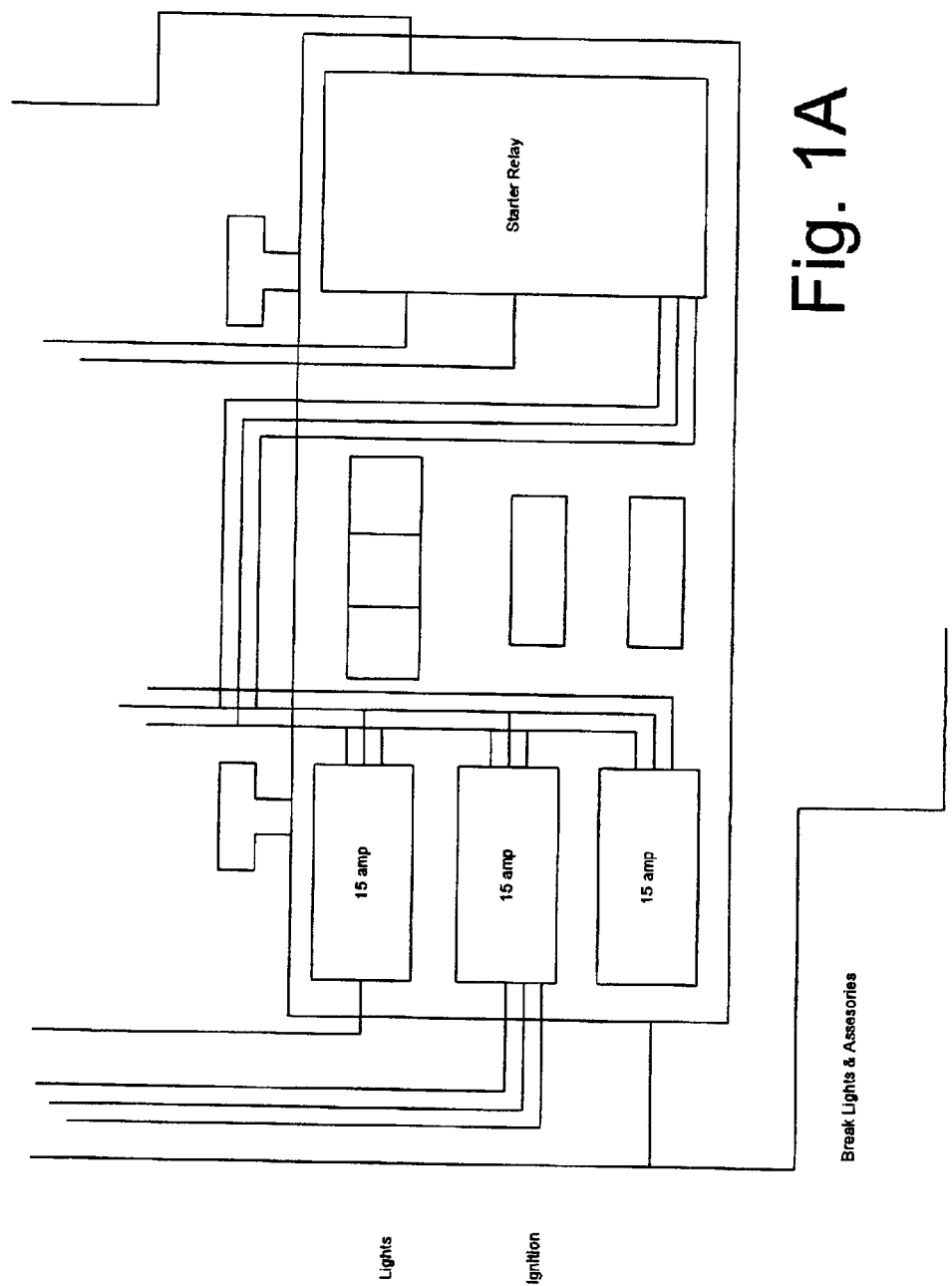

MOTORCYCLE WIRING HARNESS

BACKGROUND OF THE INVENTION

This invention relates to a wiring harness for motorcycles, and in particular to a wiring harness that is adaptable to a number of different years and models of motorcycles, and that at the same time readily connects to the various factory-installed gauges, switches, and relays on the various years and models.

As motorcycles have become more complex in recent years, the electrical systems have been modified to include various relays and interlocks designed to make the riding of the motorcycle more convenient and safer. This is true for all motorcycle manufacturers' models, including Harley Davidson®. Harley Davidson is unique however in that while its standard models are very popular, there is also a very large market for modified Harley Davidsons, and for aftermarket frames and running gear powered by Harley Davidson Engines. Many of these aftermarket bikes utilize Harley Davidson handle bar controls from 1972 through 1995 models, and use the Harley Davidson twin cam "A" or "B" style engine. The aftermarket motorcycles typically use an aftermarket ignition module, some of which include cam position sensors like the factory motorcycle, while others eliminate this factory feature.

The electrical systems of the aftermarket motorcycles are typically designed and manufactured for each application, and often utilize color coding that is different from that of the original Harley Davidson model. This can lead to difficulties in servicing the motorcycle since the normally applicable color codes are not utilized. A need therefore exists for a motorcycle wiring harness that can be utilized with a Harley Davidson® engine in a non-factory frame, and that permits the use of the engine with or without each safety interlock that is fitted to the factory motorcycle.

SUMMARY OF THE INVENTION

The present invention addresses the shortcomings of the prior art by providing a wiring harness that can be fitted to custom aftermarket motorcycles that use a Harley Davidson engine, that retain the original factory color coding, and that incorporate connectors that are engageable with the standard-equipment connectors. The harness of the present invention can be used with Harley Davidson® Evolution or twin cam engines, and can be used in aftermarket motorcycles that do not include each factory installed safety interlock. These and other features of the invention will be described below with reference to the drawings.

BRIEF DESCRIPTION OF THE DRAWINGS

FIGS. 1A through 1C together constitute a schematic view of one embodiment of the invention, including the fuse block with integral starter relay.

DETAILED DESCRIPTION OF THE PREFERRED EMBODIMENTS

Figure 1B:
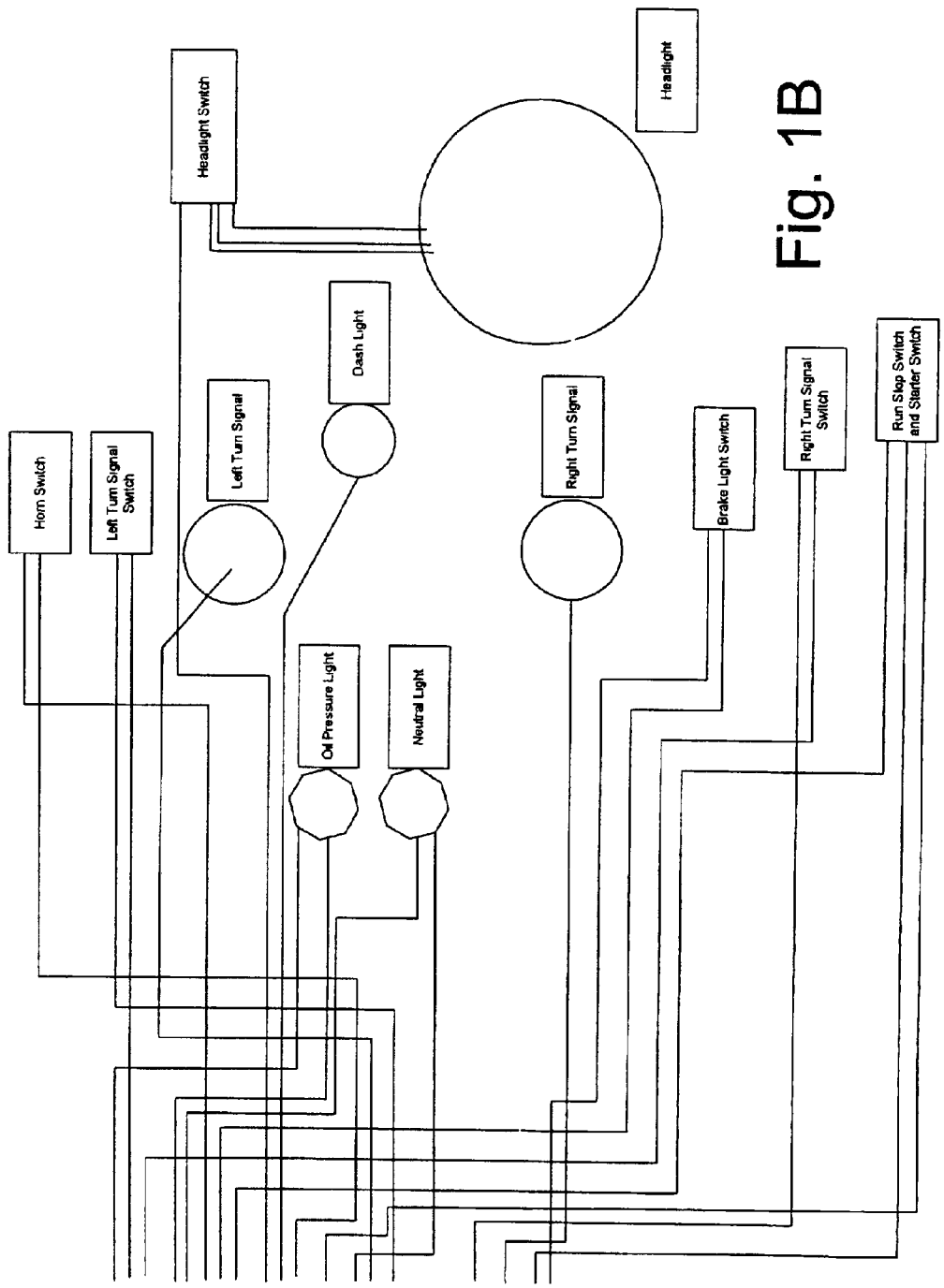
Figure 1C:
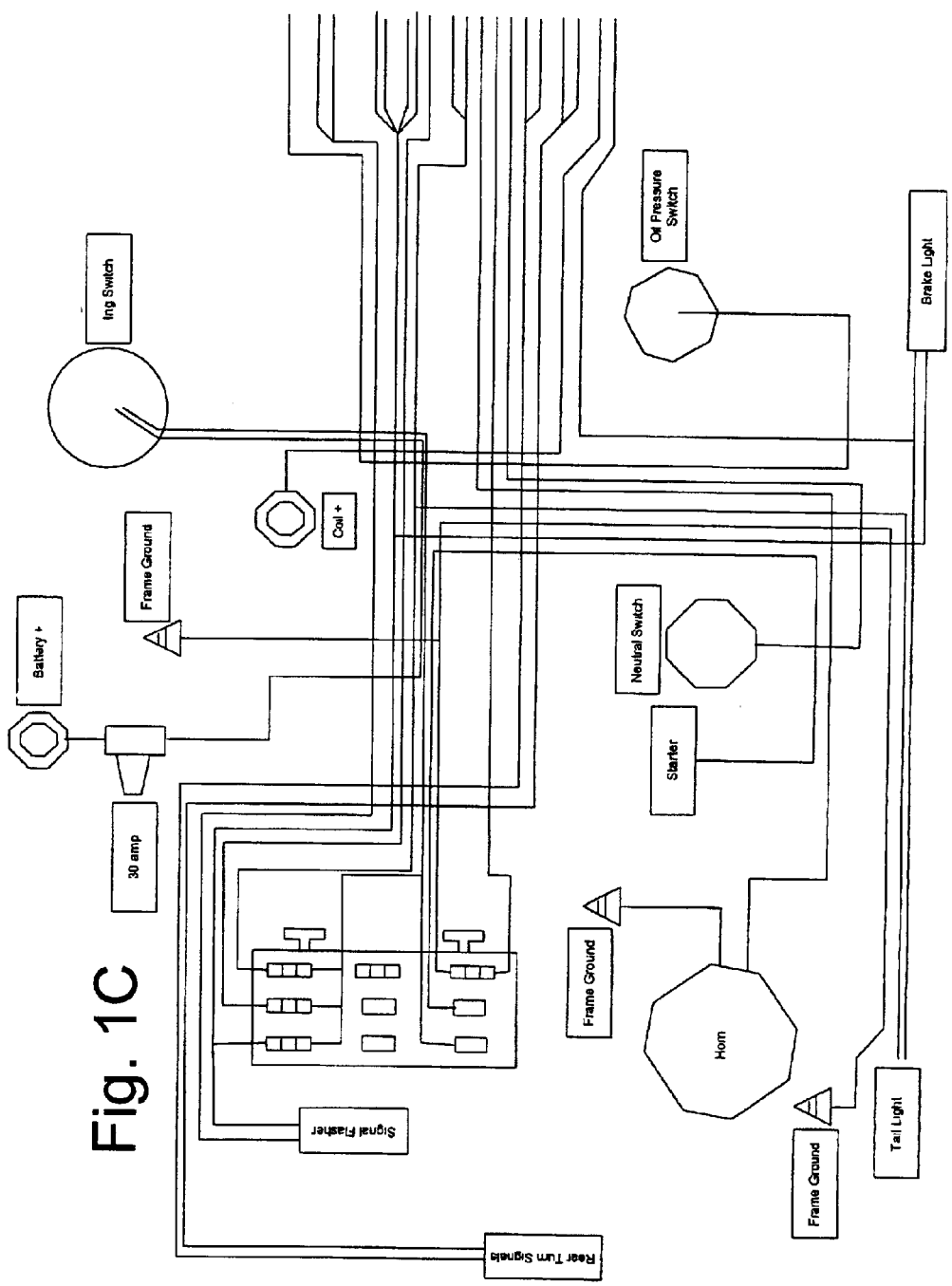
Figure 2A:
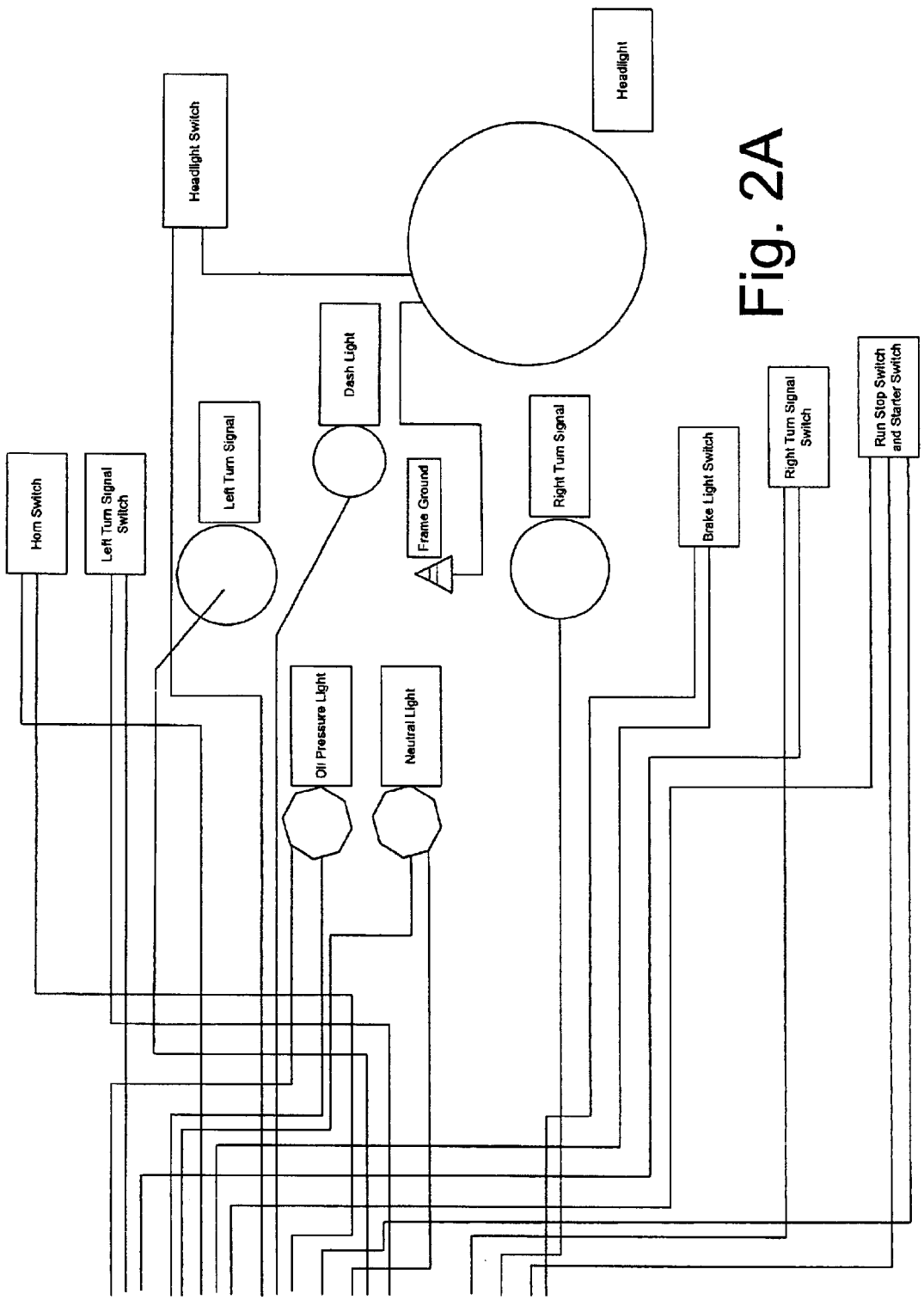
FIGS. 2A through 2D together constitute a schematic view of a second embodiment of the invention.
Figure 2B:
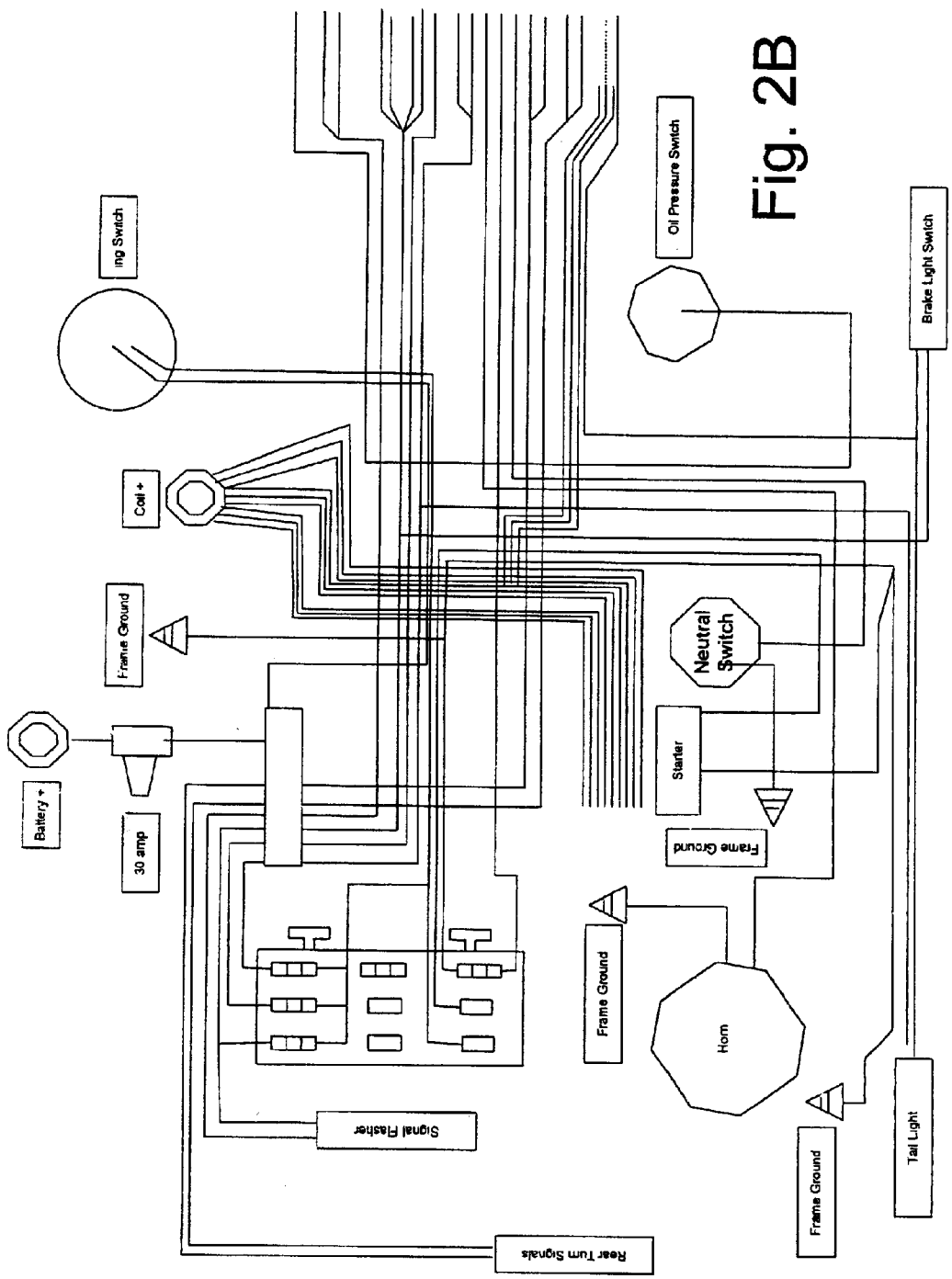
Figure 2C:
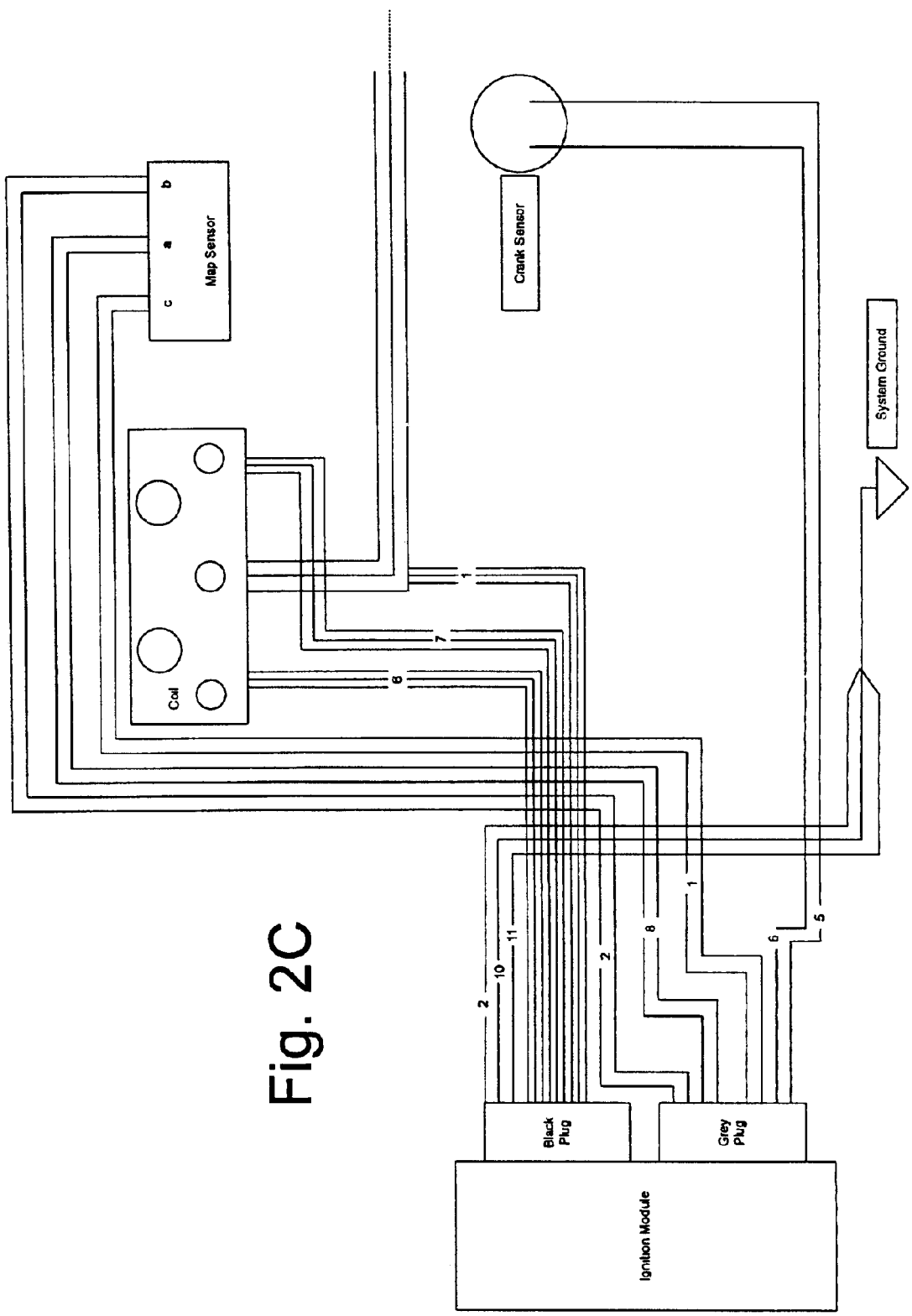
Figure 2D:
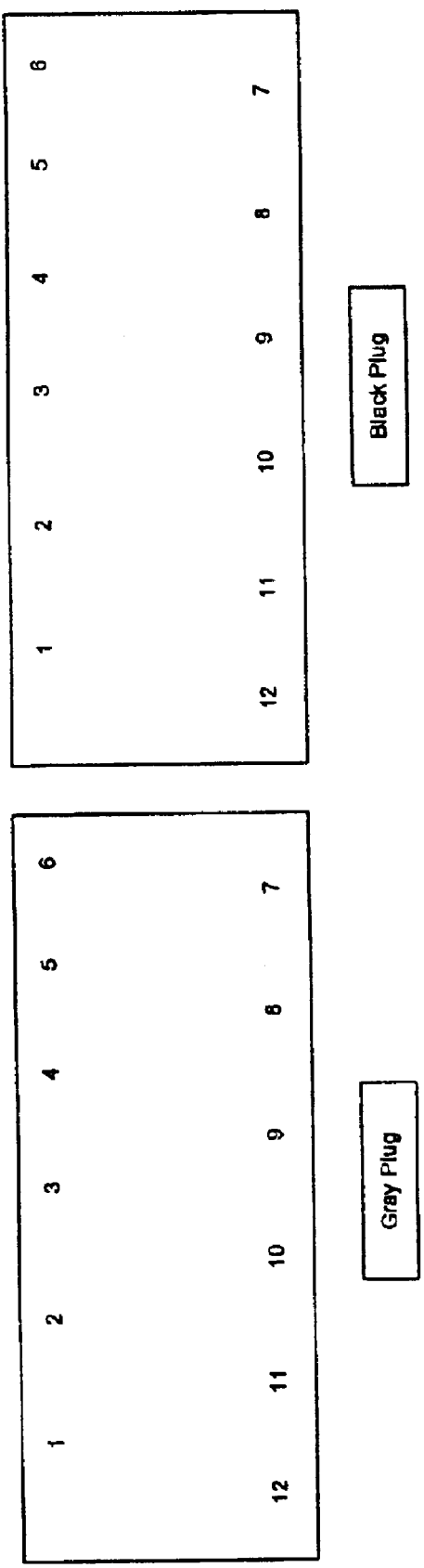

Turning now to FIGS. 1A, 1B and 1C, one preferred embodiment of the invention is compatible with any Harley Davidson twin cam engine, including those known as the "A" style and "B" style engine. FIGS. 1a and 1b show schematically the major electrical components of a motorcycle electrical system according to the invention, and which provides an electrical system with which either engine can operate satisfactorily, even though numerous features and/or accessories featured on the factory motorcycle have been eliminated. For example, customized motorcycle builders often eliminate turn signals cancellation features, and perhaps even the turn signals themselves. However, the factory wiring harness includes relays and the like to accommodate provide for these features. One embodiment of a wiring harness according to the present invention is depicted schematically in FIGS. 1A, 1B, and 1C. In this embodiment, the harness is adapted for use with any Harley Davidson® Evolution-type engine, and includes connections for permitting any style frame and combination of accessories to be used in conjunction with the Evolution type engine. In addition, the harness can be used on a custom frame that does not include safety interlocks that are found on the original factory motorcycles. At the same time, the harness retains the factory color coding system for the wiring harness, permitting factory service information to be applied to a non-factory motorcycle that nonetheless uses a Harley Davidson® Evolution type engine. Referring to FIG. 1C, the system of the present invention includes a fuse block that is adapted for mounting under the seat, and that includes a starter relay in the same convenient location.

FIGS. 2A through 2D are a schematic depiction of a wiring harness according to the invention and that is for use with a twin cam Harley Davidson® TC 88 engine. The harness shown in FIGS. 2A–2D can be used on a custom frame that does not include safety interlocks that are found on the original factory motorcycles. At the same time, the harness retains the factory color coding system for the wiring harness, permitting factory service information to be applied to a non-factory motorcycle that nonetheless uses a Harley Davidson® Evolution type engine. It can be mounted internally within the frame, or externally along frame members.

The foregoing embodiments are intended to illustrate the invention and are not intended to limit the scope of the following claims.

What is claimed is:

1. A motorcycle electrical system comprising:
    an engine having at least one spark timing sensor, the engine having an operable state selectable responsive to at least one safety interlock signal; and,
    an ignition module in communication with the spark timing sensor and that generates an ignition signal responsive to a signal from the spark timing sensor, the ignition module adapted to generate an ignition signal in the absence of the at least one safety interlock signal.

2. A motorcycle electrical system according to claim 1 further comprising a fuse block including a starter relay mounted thereon, the fuse block adapted for mounting under the motorcycle seat.

3. A motorcycle electrical system according to claim 1 further comprising at least one molded plug adapted for electrical connection to an electrical component.

4. A motorcycle electrical system according to claim 1 further comprising a portion of the electrical system adapted for mounting internally on the frame.

* * * * *